Dec. 3, 1968  D. E. SABLE  3,414,337
ROD GUIDE
Filed May 18, 1966  2 Sheets-Sheet 1

INVENTOR
DONALD E. SABLE
BY *Hastings Ashley and Walter J. Jagm*
ATTORNEYS

Dec. 3, 1968  D. E. SABLE  3,414,337
ROD GUIDE

Filed May 18, 1966  2 Sheets-Sheet 2

INVENTOR
DONALD E. SABLE

BY
ATTORNEYS

United States Patent Office 3,414,337
Patented Dec. 3, 1968

3,414,337
ROD GUIDE
Donald E. Sable, 4413 Windsor Parkway,
Dallas, Tex. 75205
Filed May 18, 1966, Ser. No. 551,161
10 Claims. (Cl. 308—4)

ABSTRACT OF THE DISCLOSURE

A sucker rod guide having a resilient tubular body provided at least at one end thereof with an arcuate recess in which an arcuate resilient fastener or clip of smaller diameter of curvature than the recess is insertable to stress the body to cause it to firmly grip a sucker rod when mounted thereon.

---

This invention relates to well tools and more particularly to guides for sucker rods employed to actuate a pump connected in the tubing of a well and to a method of mounting the guides on the rods.

An object of this invention is to provide a guide which is easily and quickly mountable on a sucker rod.

Another object is to provide a guide having a resilient tubular body provided with a central longitudinal bore and a mounting slot opening outwardly from the bore and of smaller width than the diameter of the sucker rod on which the body is positionable through which the rod is receivable during the positioning of the guide on the rod, the portions of the body on opposite sides of the mounting slot being deformed outwardly during the mounting of the body on the rod, wherein the body has an arcuate recess in at least one end thereof in which an arcuate resilient fastener or clip is insertable after the body is positioned on the rod to stress the body into firm gripping engagement with the rod and held against movement thereon.

Still another object is to provide a guide wherein the fastener stresses the body to cause inner portions of the body disposed inwardly of the fastener to be compressed against the rod and outer portions of the body disposed outwardly of the fastener to be tensioned about the fastener whereby both inner and outer portions of the body, as well as the fastener itself, exert a force tending to cause the body to firmly grip the rod.

Still another object is to provide a rod guide wherein the resilient fastener has a radius of curvature smaller than the radius of curvature of the recess of the body and wherein the body is provided with a cam surface engageable by the fastener during its insertion into the recess to facilitate and control the expansion of the fastener as it is inserted into the recess.

Still another object is to provide a guide wherein the expansion of the fastener, which is in the form of a segment of a cylinder, is caused to occur uniformly throughout its curvature and not only at one line thereof whereby breaking of the fastener due to excessive bending along one line thereof is precluded.

A further object is to provide a guide having substantially cylindrical resilient body provided with a longitudinal central bore and a laterally outwardly opening mounting slot, the slot having a pair of diametrically opposed longitudinal outwardly opening portions opening in opposite directions at opposite ends of the guide and connected at their adjacent inner ends by a transverse portion of the mounting slot whereby the guide is easily mountable on a sucker rod by positioning the guide on the rod with the rod extending through the transverse portion and aligned with the inner ends of the longitudinal portions and then pivoting the guide about an axis perpendicular to the axes of the rod and of the bore of the guide to cause the longitudinal portions of the slots to receive the rod.

A further object is to provide a guide having arcuate recesses at opposite ends thereof in which are receivable resilient fasteners or clips of substantially smaller inherent radius of curvature than the radius of the recesses whereby the fasteners when inserted in the recesses stress the guide to cause it to grip the rod.

Another object is to provide a new and improved method of mounting guides on rods which does not subject the fasteners of the guides to excessive deformation during the mounting thereof.

Still another object is to provide a new and improved method of mounting guides on rods which includes positioning the body of the guide on a rod and then inserting a resilient fastener in a recess of the body to stress the body into firm gripping engagement with the body.

Additional objects and advantages of the invention will be readily apparent from the reading of the following description of a device constructed in accordance with the invention, and reference to the accompanying drawings thereof, wherein.

Figure 1:
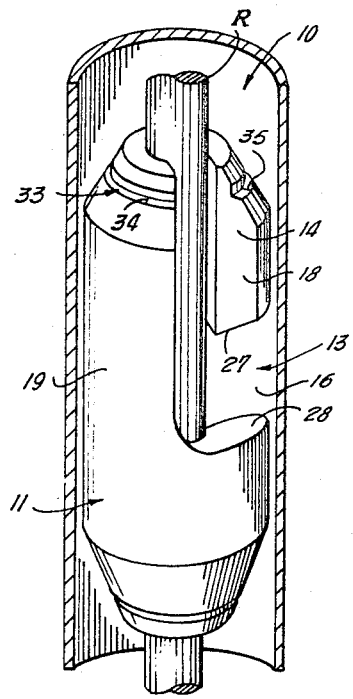
FIGURE 1 is a perspective view of a guide embodying the invention mounted on a sucker rod and located within a flow conductor such as a string of tubing.
Figure 2:
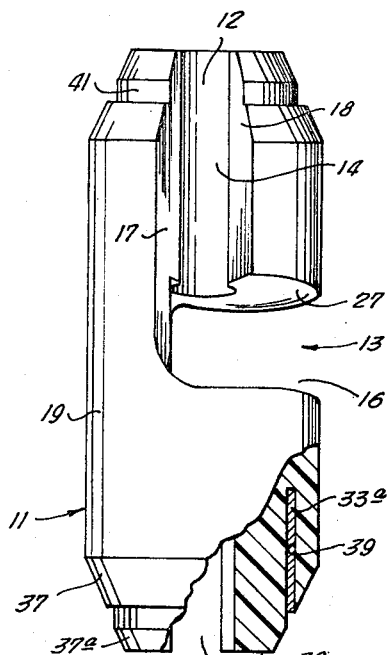
FIGURE 2 is a vertical view with some portions broken away of the rod guide.
Figure 3:
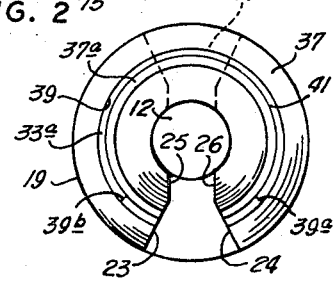
FIGURE 3 is a bottom view of the guide.
Figure 4:
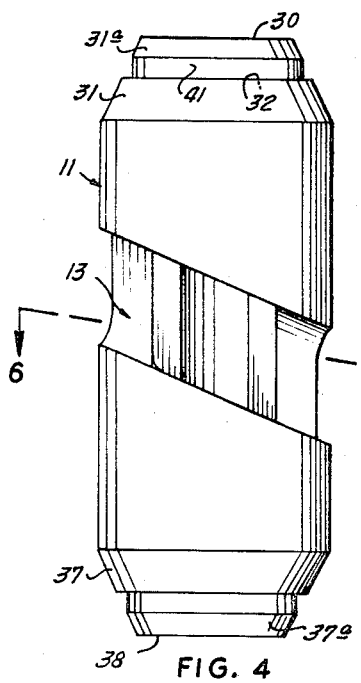
FIGURE 4 is another vertical view of the guide.

Referring now particularly to FIGURES 1 through 6 of the drawings, the guide 10 embodying the invention is mountable on a sucker rod R which is reciprocably movable in a well flow connector T, such as a string of tubing, to actuate a pump which moves well fluids through the flow conductor to the surface. The guide comprises a tubular body 11 of a somewhat resilient substance, such as rubber, nylon and the like, and has a central longitudinal bore 12 of a diameter equal to or slightly smaller than the diameter of the sucker rod R and a mounting slot 13 which opens laterally outwardly from the central bore to permit mounting of the body on the rod. The mounting slot has a pair of diametrically opposed longitudinal upper and lower portions 14 and 15 whose outer ends open to opposite ends of the transverse portion 16 of the mounting slot.

The upper slot portion 14 is defined by a pair of outer vertical surfaces 17 and 18 which extend convergently inwardly from the cylindrical outer surface 19 of the body and substantially parallel inner vertical surfaces 21 and 22 which extend inwardly from the convergent outer surfaces 17 and 18, respectively. The width of the slot portion adjacent the cylindrical outer surface of the body is greater than the diameter of the rod while its inner portion defined by the substantially parallel vertical surfaces 21 and 22 is substantially smaller than the diameter of the rod.

The lower longitudinal slot 15 is similarly defined by outer inwardly convergent vertical surfaces 23 and 24 and a pair of substantially parallel inner surfaces 25 and 26. The upper and lower surfaces 27 and 28 defining the transverse portion 16 of the slot extend parallel to one another or may diverge slightly outwardly if desired. It will be apparent that the lower end of the upper longitudinal slot portion 14 opens to the upper end of the inclined transverse portion 16 and that the upper end of the lower longitudinal slot portion 15 opens to the lower end of the transverse slot portion.

The body has a beveled upper surface 31 which slopes outwardly and downwardly from its horizontal top surface 30 to the upper end of its outer cylindrical surface 19. An upwardly opening arcuate recess 32 of the body, whose center of curvature is coincident with the central axis of the bore 12 of the body and which has an angular width of approximately 270 degrees, opens to the upper beveled surface 31 so that the upper portion 31a of the upper beveled surface 31 comprises a cam surface for controlling and facilitating the expansion and insertion of a fastener or spring clip 33 into the recess. The fastener, which is of spring steel, is in the form of a segment of a cylinder having a radius of curvature somewhat smaller than the radius of curvature of the fastener recess 32 so that the fastener must be expanded radially about the axis of the bore 12 when it is inserted into the recess. The longitudinal vertical surfaces of the body defining the longitudinal ends of the recess are spaced from the vertical surfaces 17 and 18, respectively and are located on opposite ends of the upper longitudinal slot portion 14.

The body also has a lower beveled surface 37 which slopes upwardly and outwardly from its bottom horizontal surface 38 to the lower end of its outer cylindrical surface 19. A lower downwardly opening arcuate recess 39, having the same center of curvature as the upper recess and of substantially the same angular width, opens to the lower beveled surface so that a lower portion 37a of the lower beveled surface constitutes a cam surface 30 for controlling and facilitating the expansion and insertion of a lower fastener or spring clip 33a into the lower fastener recess 39. The lower spring clip 33a may be identical to the upper spring clip 33. The longitudinal vertical surfaces 39a and 39b defining the ends of the recess are spaced from the surfaces 39a and 39b and located on opposite sides of the lower longitudinal slot portion 15.

In use, when it is desired to secure the rod guide on the sucker rod R, the guide body 11 is first moved to a transverse position relative to the rod with the transverse portion 16 of its mounting slot 13 in alignment with the rod and then is moved toward the rod until the rod is received in the transverse slot and is in alignment with the inner ends of the opposed longitudinal slot portions 14 and 15. The guide is then rotated about an axis perpendicular to the axis of its longitudinal bore and the longitudinal axis of the rod to cause the rod to be received in the longitudinal slot portions. As the body is pivoted in this manner, the convergent outer side surfaces defining the upper and lower longitudinal slot portions engage the rod, since the diameter of the rod is greater than the width of the inner portions of the convergent surfaces and the inner parallel surfaces defining the longitudinal slot portions, and the portions of the guide on opposite sides of the longitudinal slot portions deform resiliently outwardly to permit the guide to be moved to the position illustrated in FIGURE 1 wherein the rod extends through the bore 12 of the guide. These portions of the body move resiliently back to the positions illustrated in FIGURE 1. The convergent outer surfaces of the body defining the longitudinal slot portions thus act as cam surfaces to facilitate the mounting of the body on the rod.

Figure 5:
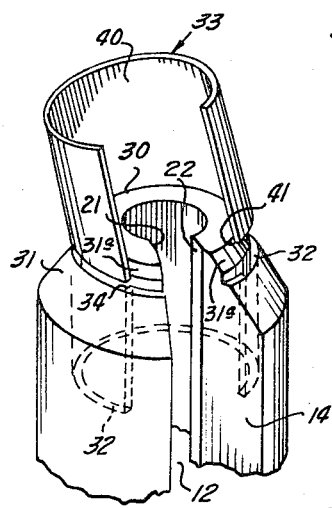
FIGURE 5 is a fragmentary perspective view of the guide showing the manner in which the fasteners are inserted into the recesses of the body.
Figure 6:
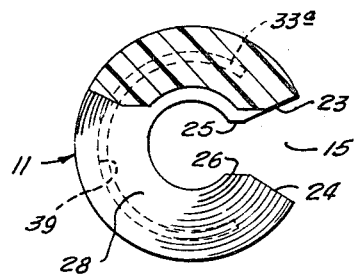
FIGURE 6 is a sectional view taken on line 6—6 of FIGURE 4.

The upper fastener 33 is then inserted into the upper recess 32 by tilting the fastener as illustrated in FIGURE 5 so that one edge portion thereof is received in one end portion of the upper recess and the inner bottom edge of the clip not in the recess abuts the upper cam surface 31a of the beveled surface 31.

The fastener is then tilted downwardly until the lower portions of its internal surface 40 thereof abut the surface 41 of the body which defines the inner side of the upper recess 32. Since all portions of the bottom inner edge abut the cam surface 33a as the fastener is tilted downwardly to enter into the slot 33, all portions of the fastener expand radially outwardly uniformly so that there is no tendency to cause any portion of the fastener to bend along a longitudinal line thereof and therefore at a relatively acute angle which might weaken the clip along such line and eventually cause a crack therein. The fastener is then moved downwardly into their recesses, as by light blows delivered to its upper edge with a hammer or other suitable tool, until it is completely within the upper recess. As the fastener 33 is moved downwardly into the recess the inner portion of the body disposed inwardly of its recess 32 and of the spring clip is compressed by the fastener, and, since the recess, at least at some portions thereof, may be narrower than the thickness of the fastener, the outer portions of the body disposed outwardly of the recess 32 and of the fastener 33 are expanded outwardly and therefore placed under tension. This stressing of the upper portion of the body by the fastener and the resilient force of the fastener itself, which has been expanded to have a radius of curvature greater than its inherent radius of curvature, now causes a force to be applied to the inner portions of the body to cause them to firmly grip and hold the rod. The tensioning of the outer portion of the body also causes the outer portion of the body to exert an inward force on the spring clip thus adding to the force with which the upper portion of the body grips the rod.

If desired, the lower fastener 33a may now be similarly inserted upwardly into the lower recess 39 so that the lower portion of the body will also, due to the force exerted by the fastener and the tensional force of the outer portion of the body disposed outwardly of the lower fastener, cause the lower portion of the body to grip the rod firmly.

It will now be seen that during the installation of the guide on the rod, the fasteners 33 and 33a are not expanded beyond the position they assume when in the recesses since they are inserted into the body recesses after the body is on the rod. If the fasteners were in the recesses at the time the body is rotated relative to the rod to receive the rod through its upper and lower longitudinal slot portions of its mounting slot, the free ends of the fasteners would be forced apart a considerable distance thus causing them to bend outwardly along longitudinal lines. Such excessive and uncontrolled bending along one line of each fastener would weaken the fastener thus reduce the force with which the body is held in gripping engagement with the rod. The fasteners could also crack along such bend line and thus be rendered ineffective to hold the body against movement on the rod.

Each recess is positioned preferably a substantial distance from the bore 12, for example, a distance equal to one fifth to one half of the distance between the bore 12 and the outer surface 19 of the body so that the fasteners have a relatively large radius of curvature to permit them to have a greater strength and so that the degree of expansion thereof for a given stress force to be exerted thereby on the body when inserted into the recesses may be small.

The recesses and the fasteners are preferably of substantial angular widths, for example, more than 180 degrees and approximately 270 degrees to permit the fasteners to exert a relatively great force on the body, and the body to exert a relatively great gripping force on the rod, over great areas of contact.

It will also be apparent that should any of the fasteners be defective and crack at the time of their expansion and insertion into the recesses of the body, such cracks will be easily detected since each fastener as it is expanded is exposed to view of the person who is inserting it into the recess.

It will be apparent that the mounting slot 13 also forms a longitudinal passage to facilitate flow of well fluids past the rod guide.

If at least one of the fasteners is not inserted in a recess of the body, the guide will be capable of movement relative to the rod should some force tend to hold the guide against movement relative to the rod. For example if the rod tends to move laterally in the tubing, the guide will engage the internal surfaces of the tubing and its movement will be arrested or impeded by the engagement thereof with the internal wall surfaces of the tubing. The guide in that case will tend to move to a position within the tubing of minimum frictional engagement with the tubing and with the rod.

Figure 7:
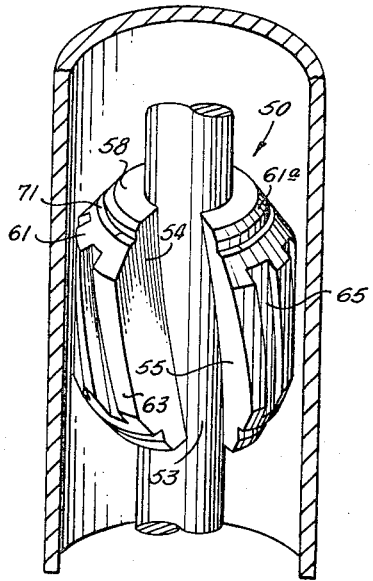
FIGURE 7 is a perspective view of a modified form of the guide embodying the invention mounted on a sucker rod and located within a tubing.
Figure 8:
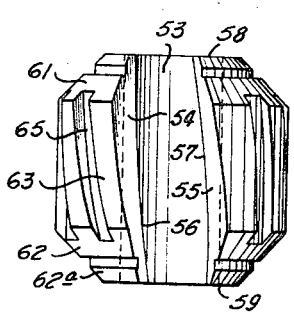
FIGURE 8 is a side view of the guide illustrated in FIGURE 7.
Figure 9:
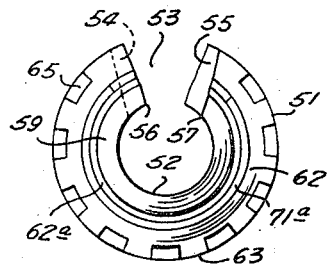
FIGURE 9 is a bottom view of a guide illustrated in FIGURES 7 and 8.

Referring now to FIGURES 7, 8 and 9 of the drawings, the guide 50 embodying the invention includes a tubular body 51 formed of a somewhat resilient durable substance such as rubber, nylon and the like. The scraper has a central longitudinal bore 52 whose diameter is substantially equal to the diameter of the rod R. The guide has a longitudinal inclined slot 53 defined by the parallel inclined surfaces 54 and 55 which extend convergently inwardly to the longitudinal edges 56 and 57, respectively, at the juncture of these surfaces with the internal surface of the guide defining the bore 52. The edges 56 and 57 are spaced apart at a distance smaller than the diameter of the rod. The surfaces 54 and 55 defining the slot 53 are disposed in places which extend at an angle relative to the central longitudinal axis of the guide so that the guide must be tilted about a horizontal axis to permit the rod to be received in the slot and pass therethrough into the bore 52. The body flexes resiliently outwardly to permit the reception of the shank within its bore since the inner edges 56 and 57 are spaced apart a distance smaller than the external diameter of the rod. As the rod is received within the bore of the body, the body is tilted back until its longitudinal axis is concentric with the longitudinal axis of the rod and the body is then in position on the rod illustrated in FIGURE 7.

The body has top and bottom planar surfaces 58 and 59 which extend perpendicular to the longitudinal axis of its bore and with top and bottom outwardly convergent beveled surfaces 61 and 62 which facilitate the movement of the body past internal obstructions in the tubing. The outer cylindrical surface 63 of the body is provided with a plurality of circumferentially spaced peripheral passages or slots 65 which extend at an angle to the central longitudinal axis of the body and which open upwardly through the upper beveled surface 61 and downwardly through the lower beveled surface 62.

The body is provided with an arcuate upper recess 70 which opens upwardly through the top upper beveled surface 61 in which is insertable a fastener or steel clip 71. The bottom portion is provided with a lower recess 72 which opens downwardly through the beveled surface 62 in which is receivable a fastener or spring clip 71a. It will be apparent that the body 51 of the guide is mounted on the rod in the manner described above and that thereafter the fasteners may be inserted into the recesses in the manner previously described in connection with the guide 10. The outer portions 61a and 62a of the upper and lower beveled surfaces 61 and 62, respectively, act as cam surfaces to control and facilitate the expansion of the fasteners which are in the form of segments of a cylinder whose radii of curvature are somewhat smaller than the radii of curvature of the arcuate recesses of the body. The fasteners 71 and 71a, which may be of identical configuration, compress the inner portions of the body disposed inwardly of the recesses into firm gripping engagement with the rod and tension the outer portions of the body 51 in the same manner as described above in connection with the guide 10.

It will be apparent that while the guide 50 has been illustrated and described as having two recesses at its opposite ends in which two fasteners are insertable, if desired, a single recess only could be provided which could extend throughout the length of the body into which one large fastener or two small fasteners could be inserted.

It will now be seen that each form of the guide embodying the invention has a resilient body formed of a suitable resilient durable substance, such as nylon or the like, provided with a longitudinal mounting slot, such as the slots 13 and 53, by means of which the body may be mounted on a rod and that the body is provided at least one end thereof with a recess of more than 180 degrees angular width in which is insertable a resilient fastener or steel spring clip, the fastener having an inherent radius of curvature when not expanded which is smaller than the radius of curvature of the recess so that when the fastener is inserted in the recess, the fastener will compress the portions of the body disposed inwardly of the recess to cause them to move into gripping engagement with the rod.

It will further be seen that the recess of the body is concentric with the bore of the body and is spaced a substantial distance from the bore so that the fastener has a relatively large radius of curvature and the portion of the body disposed inwardly of the recess is of substantial radial thickness.

It will further be seen that the recesses and the fasteners are in the form of segments of cylinders of substantial angular width, preferably more than 180 degrees, having the same longitudinal axis as the bore of the body whereby the force exerted on the body by each fastener when the fastener is inserted in a recess of the body is applied over a large area of contact of the fastener with the body and, similarly, the gripping force applied to the rod is exerted over a large area of contact of the body with the rod.

It will further be seen that the ends of the recesses are spaced from the side surfaces defining the mounting slot of the body.

It will further be seen that since the fasteners are not in the recesses of the body of the guide when the body is mounted on the rod, the body is easily mountable on the rod because only a small force is required to deform the body as the rod is moved through the longitudinal mounting slot into the central bore.

It will further be seen that the angular width of the mounting slot may be quite small because the fasteners are not in the recesses during the installation so that a relatively large area of contact of the body with the rod can be obtained.

It will further be seen that the angular widths of the fasteners themselves thus may be relatively great, for example, 240 degrees and greater, since the mounting slots are relatively smaller.

It will further be seen that relatively much stronger fasteners may be employed since the fasteners are not required to be expanded during the mounting of the body on the rod.

It will further be apparent that in some installations wherein the string of tubing is relatively straight only one fastener may be sufficient to hold the body of the guide rigid with the rod, thus saving cost of one fastener and the time and labor of installing a second fastener.

It will further be seen that since the fasteners are not molded or bonded to the bodies of the guide, fasteners of different characteristics may be inserted at the site of use as required by the particular characteristics of the fluids which flow through such flow conductors. For example if the fluids are very corrosive the fasteners may be made of stainless steel or other suitable corrosion resistant substance.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A guide for a sucker rod comprising: a tubular resilient body having a longitudinal central bore and a longitudinal mounting slot opening to said bore, inner portions of said mounting slot being of smaller width than the diameter of a rod, said body being deformable resiliently to permit movement of the body on the rod to position wherein the rod extends through said central bore, said body having an arcuate longitudinal recess opening at one end of said body, said recess being concentric with said bore and having an angular width of more than 180 degrees in which an arcuate fastener is receivable, opposite longitudinal ends of said recess being spaced from said mounting slot, said body also having a substantially cylindrical outer middle surface and a bevelled surface extending longitudinally from at least one end of said outer surface, said recess opening through said bevelled surface said bevelled surface having an outermost portion providing a cam surface sloping radially outwardly towards said recess, said cam surface being engageable with a fastener during its insertion into the recess for controlling and facilitating the expansion of the fastener.

2. The guide of claim 1, wherein said recess is spaced from said central bore a distance more than one fifth the distance between said central bore and the outer surface of said body.

3. A guide for a sucker rod comprising: a tubular resilient body having a longitudinal bore in which a rod is receivable and a longitudinal mounting slot opening to said bore, inner portions of said mounting slot adjacent said central bore being of smaller width than the diameter of a rod, said body being deformable resiliently to permit movement of the body onto the rod to position wherein the rod extends through said bore, said body having a pair of longitudinal recesses opening to opposite ends of said body, said recesses being concentric with said bore and each having an annular width of more than one hundred eighty degrees, opposite longitudinal ends of said recesses being spaced from said mounting slot, said body also having a substantially cylindrical middle outer surface and bevelled surfaces extending longitudinally outwardly from opposite ends of said outer surface, said recesses opening through said bevelled surfaces, and outermost portions of said bevelled surfaces providing cam surfaces extending radially outwardly towards said recesses, said cam surfaces being engageable by fasteners during the insertion of the fasteners into the recesses for controlling and facilitating the expansion of the fasteners.

4. The guide of claim 3, wherein said recesses are spaced from said central bore a distance more than one fifth the distance between said central bore and said outer surface of said body.

5. A guide for a sucker rod comprising: a tubular resilient body having a longitudinal bore and a longitudinal mounting slot opening to said bore, inner portions of said mounting slot being of smaller width than the diameter of the rod whereby said body deforms resiliently to permit movement of the body onto the rod to a position wherein the rod extends through said bore, said body having an arcuate longitudinal recess opening to one end of said body, opposite longitudinal ends of said recess being spaced from said mounting slot and on opposite sides thereof; and a resilient fastener insertable in said recess, said fastener being in the form of a segment of a cylinder having a radius of curvature smaller than the radius of curvature of said recess whereby said fastener must be radially expanded when it is inserted into said recess, said body also having a substantially cylindrical outer middle surface and a bevelled surface extending longitudinally from one end of said outer surface, said recess opening through said bevelled surface and an outermost portion of said bevelled surface providing a cam surface sloping radially outwardly toward said recess, said cam surface being engageable with the fastener during its insertion into the recess for controlling and facilitating the expansion of the fastener.

6. The guide of claim 5, wherein said recess is spaced from said central bore a distance more than one fifth the distance between said central bore and the outer surface of said body.

7. A guide for a sucker rod comprising: a resilient body having a longitudinal bore therethrough to receive the rod, said body having a longitudinal mounting slot therethrough communicating with said bore, said slot having two longitudinal portions opening from the bore in mutually opposite radial directions and being narrower in width at their inner portions than the diameter of the rod, said slot having a transverse portion joining the two longitudinal portions, said body having an arcuate longitudinal recess opening to one end of said body in which an arcuate fastener is receivable, said recess being concentric with said bore and having an angular width of more than one hundred eighty degrees opposite longitudinal ends of said recess being spaced from opposite surfaces of said body defining the longitudinal slot portion opening to one end of said body, said body also having a substantially cylindrical middle surface and a bevelled surface extending longitudinally from said outer surface at said one end of said body, said recess opening through said bevelled surface, said bevelled surface having an outermost portion providing a cam surface sloping radially outwardly toward said recess, said cam surface being engageable with a fastener during its insertion into the recess for controlling and facilitating the expansion of the fastener.

8. The guide of claim 6, wherein said recess is spaced from said central bore a distance more than one-fifth the distance between said central bore and the outer surface of said body.

9. A guide for a sucker rod comprising: a resilient body having a longitudinal bore therethrough to receive the rod, said body having a longitudinal mounting slot therethrough communicating with said bore, said slot having two longitudinal portions opening from the bore in mutually opposite radial directions and being narrower in width at their inner portions than the diameter of the rod, said slot having a transverse portion joining said longitudinal portions, said body having an outer cylindrical surface and beveled surfaces which extends in opposite direction from opposite ends of said cylindrical surface, said body having arcuate longitudinal recesses concentric with said bore, said recesses being concentric with said bore and having an angular width of more than 180 degrees, opposite longitudinal ends of said recesses being spaced from opposite surfaces of said body defining adjacent longitudinal slot portions, said recesses opening through said beveled surfaces, and outermost portions of said beveled surfaces provide cam surfaces sloping radially outwardly toward said recess, said cam surfaces being engageable with fasteners during their insertion into the recesses for controlling and facilitating the expansion of the fastener; and resilient fasteners in said recesses, said fasteners being in the form of segments of a cylinder having a radius of curvature smaller than the radius of curvature of said recesses whereby said recesses must be radially expanded when inserted into said recesses.

10. The guide of claim 9 wherein the angular width of said recesses and said fasteners is more than 240 degrees.

References Cited

UNITED STATES PATENTS

| | | | |
|---|---|---|---|
| 438,822 | 10/1890 | Philion | 74—230.11 |
| 2,002,893 | 5/1935 | Holt | 308—4 |
| 2,928,473 | 3/1960 | Tripplehorn | 166—176 |
| 3,058,524 | 10/1962 | Tripplehorn | 166—176 |
| 3,129,964 | 4/1964 | McNeil. | |
| 3,184,362 | 5/1965 | Litsky | 29—451 X |
| 3,186,773 | 6/1965 | Harris | 308—4 |
| 3,195,928 | 7/1965 | Pasternack. | |

MARTIN P. SCHWADRON, *Primary Examiner.*

L. L. JOHNSON, *Assistant Examiner.*